(12) United States Patent
Boucadair

(10) Patent No.: US 8,693,369 B2
(45) Date of Patent: Apr. 8, 2014

(54) METHOD OF ROUTING A DATA PACKET IN A NETWORK AND AN ASSOCIATED DEVICE

(75) Inventor: Mohamed Boucadair, Rennes (FR)

(73) Assignee: Orange, Paris (FR)

( * ) Notice: Subject to any disclaimer, the term of this patent is extended or adjusted under 35 U.S.C. 154(b) by 385 days.

(21) Appl. No.: 12/935,040

(22) PCT Filed: Mar. 31, 2009

(86) PCT No.: PCT/FR2009/050548
§ 371 (c)(1),
(2), (4) Date: Sep. 28, 2010

(87) PCT Pub. No.: WO2009/125158
PCT Pub. Date: Oct. 15, 2009

(65) Prior Publication Data
US 2011/0019588 A1 Jan. 27, 2011

(30) Foreign Application Priority Data
Mar. 31, 2008 (FR) ...................................... 08 52108

(51) Int. Cl.
*H04L 12/28* (2006.01)
(52) U.S. Cl.
USPC .......................................... 370/254; 370/351
(58) Field of Classification Search
USPC ................................................. 370/254, 351
See application file for complete search history.

(56) References Cited

U.S. PATENT DOCUMENTS

| | | | |
|---|---|---|---|
| 7,320,027 B1 | 1/2008 | Chang et al. | |
| 7,751,339 B2 * | 7/2010 | Melton et al. | 370/252 |
| 7,894,451 B2 * | 2/2011 | Parker et al. | 370/395.32 |
| 7,986,670 B2 * | 7/2011 | Babbar et al. | 370/331 |
| 2002/0116523 A1 | 8/2002 | Warrier et al. | |
| 2002/0141389 A1 | 10/2002 | Fangman et al. | |
| 2003/0053448 A1 * | 3/2003 | Craig et al. | 370/353 |
| 2003/0088694 A1 * | 5/2003 | Patek et al. | 709/238 |
| 2009/0279548 A1 * | 11/2009 | Davis et al. | 370/394 |
| 2011/0067119 A1 * | 3/2011 | Baum | 726/34 |

* cited by examiner

*Primary Examiner* — Hassan Kizou
*Assistant Examiner* — Deepa Belur
(74) *Attorney, Agent, or Firm* — Drinker Biddle & Reath LLP

(57) ABSTRACT

A method of routing a data packet in a telecommunications network, said packet comprising a primary destination address and a destination port number. On reception of said packet, the following steps are executed: determining a port mask defining a range of port numbers to which the destination port number belongs; selecting an identifier of a destination piece of equipment of the packet from a plurality of equipment identifiers associated with said destination address on the basis of the port mask; and routing the packet to the destination piece of equipment on the basis of said identifier.

17 Claims, 9 Drawing Sheets

| | | | | | | | | | | | | | | | MC |
|---|---|---|---|---|---|---|---|---|---|---|---|---|---|---|---|

| 1 | 1 | 1 | x | x | x | x | x | x | x | x | x | x | x | x |
|---|---|---|---|---|---|---|---|---|---|---|---|---|---|---|
| 1 | 1 | 1 | 1 | x | x | x | x | x | x | x | x | x | x | x |
| 1 | 1 | 1 | 1 | 1 | 1 | 1 | 1 | 1 | 1 | 1 | x | x | x | x |
| 1 | 1 | 1 | 1 | 1 | 1 | 1 | 1 | 1 | 1 | x | x | x | x | x |
| 1 | 1 | 1 | 1 | 1 | 1 | 1 | 1 | 1 | 1 | 1 | x | x | x | x |
| 1 | 1 | 1 | 1 | 1 | 1 | 1 | 1 | 1 | 1 | 1 | 1 | 1 | 1 | x |
| x | x | x | x | 1 | 1 | 1 | 1 | 1 | 1 | 1 | 1 | 1 | 1 | 1 |
| x | x | x | x | x | 1 | 1 | 1 | 1 | 1 | 1 | 1 | 1 | 1 | 1 |

FIG. 2A

| 1 | 1 | 1 | x | x | x | x | 1 | x | x | x | x | x | x | x |
|---|---|---|---|---|---|---|---|---|---|---|---|---|---|---|
| 1 | 1 | 1 | 1 | x | x | x | 1 | 1 | x | x | x | x | x | x |
| 1 | 1 | 1 | 1 | x | x | 1 | 1 | 1 | 1 | x | x | x | x | x |
| 1 | 1 | 1 | 1 | 1 | x | x | 1 | 1 | x | x | x | x | x | x |
| 1 | 1 | 1 | 1 | 1 | 1 | 1 | 1 | 1 | 1 | x | x | 1 | x | x |
| 1 | 1 | 1 | 1 | x | x | x | 1 | x | 1 | x | 1 | 1 | 1 | x |
| x | x | x | x | 1 | x | 1 | x | 1 | x | 1 | x | 1 | 1 | 1 |
| x | x | x | x | x | 1 | 1 | x | 1 | x | 1 | 1 | x | x | x |

FIG. 2B

METHOD OF ROUTING A DATA PACKET IN A NETWORK AND AN ASSOCIATED DEVICE

CROSS-REFERENCE TO RELATED APPLICATIONS

This application is the U.S. national phase of the International Patent Application No. PCT/FR2009/050548 filed Mar. 31, 2009, which claims the benefit of French Application No. 08 52108 filed Mar. 31, 2008, the entire content of which is incorporated herein by reference.

FIELD OF THE INVENTION

The field of the invention is that of telecommunications networks, in particular IP telecommunications networks in which packets of data are transported from source equipment to destination equipment identified by a destination address.

BACKGROUND

Such a telecommunications network groups together a plurality of pieces of equipment, connections, and functions dedicated to transporting data coming from terminal equipment connected to the network. In particular, the transport functions may be implemented by activating routing and transmission protocols. A telecommunications network administered by an operator is also called a domain.

An IP connectivity service provider deploys a dedicated architecture to enable users of terminal equipment to be contacted. Access to the IP connectivity service is managed by the service provider using the telecommunications network of an operator to route data packets sent by pieces of terminal equipment to their final destination. Said service provider is sometimes also the operator of the telecommunications network.

The invention relates to a mechanism for allocating addresses and port numbers enabling the same primary address to be assigned to a plurality of pieces of terminal equipment of the telecommunications network.

Thus the invention applies to any type of public or private addressing, but it applies especially to public IP addresses defined by the Internet Protocol version 4 (IPv4), although this is not limiting on the invention.

In known manner, a home gateway between a terminal of a private home network and the public telecommunications network of an operator, also known as a domain, includes a table in which it associates the private IP address and the port associated with the terminal with an IPv4-type public IP address and a port of the same gateway on the public network. This table is known to the person skilled in the art as a NAT (Network Address Translation) table.

It is commonly accepted in the IP service provider community that exhaustion of public IPv4 addresses is inevitable. To avoid this problem, the community has already taken action to define a new protocol, Internet Protocol version 6 (IPv6), which offers a large number of IP addresses and a hierarchical routing mechanism offering improved performance. However, that solution is not in practice activated by operators for financial or strategic reasons. The same providers are nevertheless not indifferent to recent warnings emanating from the Internet Engineering Task Force (IETF), especially in reports presented within the Global Routing Operations Working Group (GROW) concerning the risk of exhaustion of IANA IPv4 addresses by the end of 2009.

To limit the number of IPv4 public addresses necessary to provide an IP connectivity service, a dual NAT or Operator NAT solution has been proposed and implemented. It activates a NAT function in the telecommunications network of the operator so that the home gateways use private addressing in their NAT tables. Consider a piece of terminal equipment 120 in a home network RD connected to a home gateway 220 between the terminal equipment and a telecommunications network RT (see FIG. 1). The gateway implements a first NAT function NAT1 which translates a first private address pair of a data packet PT sent by the terminal equipment 120 into a second private address pair (@ PRIV2, P2). It then sends the transformed PT packet in the network RT. That packet is received by network equipment NO. This equipment NO executes an Operator NAT function NAT2 that translates the second private address pair (@ PRIV2, P2) of the data packet PT into a third public address pair (@ PUB3, P3). Thus it is the operator's NAT function that translates the private addresses of home gateways to public addresses, which saves a non-negligible number of IPv4 public addresses.

The Operator NAT solution has drawbacks, including:
the routing of IP data packets is made more complex: because of the introduction of a second level of address translation, data packets must be modified twice;
the need to adapt the implementation of conventional application or application level gateway (ALG) signaling protocols such as DNS (domain name system), FTP (file transfer protocol), or SIP (session initiation protocol). With the SIP, for example, in order to keep its NAT table up to date, setting up and maintaining a voice over IP session require the home gateway in the SIP signaling path to act, in known manner to force artificial exchanges of signaling between the subscriber's terminal and the public network, thereby imposing a high frequency of re-registration requests; in the presence of dual network address translation, such a mechanism must also be provided in the equipment that hosts the Operator NAT function;
degraded IP connectivity service offered by the operator of the public telecommunications network can only be deplored, especially because functions such as port forwarding or DynDNS cannot be supported in the presence of Operator NAT.

SUMMARY

There is therefore a need to alleviate those drawbacks of the prior art.

To be more precise, there is a need to provide a new solution for economizing on the use of public IP addresses without this leading to degraded service being rendered to the client terminal.

The invention addresses this need by way of a method of routing a data packet in a telecommunications network, said packet including a primary destination address and a destination port number, said method including, on reception of said packet, the following steps:
determining a port mask defining a range of port numbers to which the destination port number belongs;
selecting a routing identifier of a destination piece of equipment of the packet from a plurality of terminal equipment routing identifiers associated with said destination address on the basis of the determined port mask; and
routing the packet to the destination equipment on the basis of said identifier.

In a correlated way, the invention provides a device for routing an IP data packet in a telecommunications network, said packet including a primary destination address and a destination port number, characterized in that said device is adapted, on reception of said packet, to implement means for:

- determining a port mask defining a range of port numbers to which the destination port number belongs;
- selecting an identifier of a destination piece of equipment of the packet from a plurality of equipment identifiers associated with said primary destination address on the basis of the port mask; and
- routing the packet to the destination equipment on the basis of said identifier.

Thus the invention is based on an entirely novel and inventive approach to routing a data packet that relies on a unique combination consisting of the destination address of the packet, the port mask defining a range of port numbers that includes the destination port number of the received packet and a routing identifier of the destination terminal equipment. The invention thus makes it possible to assign the same routable primary address in the telecommunications network to a plurality of pieces of terminal equipment connected to that network and thus to economize on the use of public IP addresses without having recourse to the Operator NAT solution. The invention thus constitutes a solution to the exhaustion of IPv4 addresses that is simple, effective, and continuous with standard practices in the field. It enables a provider to increase its customer base significantly. It requires no sizeable investment and it thus enables capital expenditures (CAPEX) and operative expenditures (OPEX) to be optimized.

The invention applies to routing data packets to any type of destination terminal equipment, whether or not it is connected to a home network, and in particular, without this being limiting on the invention, to a home gateway between a home network and a public telecommunications network.

The routing method of the invention is implemented by telecommunications network equipment. Consequently, the invention also provides telecommunications network equipment adapted to receive a data packet containing a destination address and a destination port number, said equipment including a routing device of the invention.

All data streams sent to the terminal equipment therefore pass through such equipment, which may be a router or dedicated equipment of the telecommunications network.

The primary address is advantageously a public address. An advantage of using public addresses is that this avoids address translation and protocol correction at the periphery of a domain administered by a service provider.

In a first implementation of the invention, said at least one identifier is a secondary address of the destination terminal equipment. Such a secondary address, also referred to as private address, cannot be routed throughout the telecommunications network. It has a restricted range, limited to exchanging streams between the terminal equipment and the telecommunications network equipment using the method of the invention. This address is not announced beyond the border gateway protocol (BGP) domain of the telecommunications network of a given operator.

The method advantageously further includes, before the routing step, a step of transforming the packet to add to it said secondary address, and the packet is routed to the destination terminal equipment on the basis of said secondary address.

According to one aspect of the first implementation of the invention, the transformation step encapsulates the packet in another packet sent to said secondary address.

An advantage of this encapsulation is that it does not require modification of the internal structure of the packet. This avoids writing and calculating a new checksum.

According to another aspect of the first implementation of the invention, the transformation step adds the secondary address of the destination equipment to a field of the packet.

A first advantage of this is that such transformation makes it possible to optimize the use of bandwidth because, unlike the encapsulation process, it does not require the addition of two headers. A second advantage is that it exploits the source routing option of the Internet Protocol, for example.

In a second implementation of the invention, the identifier is a route identifier specific to the terminal equipment and the packet is routed on the basis of said specific route identifier. Here a specific route is a dedicated route for connecting to this equipment and that serves only this terminal equipment in the plurality of pieces of equipment having the same primary address.

Combined with the primary address and the port mask assigned to the destination terminal equipment, this specific route identifier makes it possible both to identify that equipment uniquely and to route the received data packet.

An advantage is that no transformation of the packet is necessary. This implementation of the invention requires work on the underlying telecommunications network of the operator in order to install in the equipment that implements the invention separate routes to pieces of equipment having the same primary address.

In one particular implementation of the invention the steps of the method of routing a data packet are determined by computer program instructions.

Consequently, the invention also provides a computer program on a data medium and adapted to be executed in a routing device or more generally in a computer, this program including instructions adapted to execute the steps of a routing method as described above.

This program may use any programming language and take the form of source code, object code or a code intermediate between source code and object code, such as a partially-compiled form, or any other desirable form.

The invention also provides a computer-readable data medium containing instructions of a computer program as referred to above.

The data medium may be any entity or device capable of storing the program. For example, the medium may include storage means, such as a read only memory (ROM), for example a compact disk (CD) ROM or a micro-electronic circuit ROM, or magnetic storage means, for example a floppy disk or a hard disk.

The data medium may be a transmissible medium such as an electrical or optical signal, which may be routed via an electrical or optical cable, by radio or by other means. The program of the invention may in particular be downloaded over an Internet-type network.

Alternatively, the data medium may be an integrated circuit in which the program is incorporated, the circuit being adapted to execute the method in question or to be used in its execution.

The invention also provides a method of configuring terminal equipment connected to a telecommunications network, including, on reception of a configuration request sent by said equipment, the following steps:

- assigning to said piece of terminal equipment a primary address shared with a plurality of pieces of terminal equipment;
- assigning to said piece of terminal equipment a port mask defining a range of numbers dedicated to it and a routing identifier; and sending to said piece of terminal equipment a configuration message including said primary address, said port mask, and said routing identifier.

A plurality of pieces of terminal equipment configured in accordance with the invention receive the same primary address. It is the combination of this primary address, the routing identifier, and the port mask that makes it possible to identify them individually and uniquely.

According to one aspect of the invention, the configuration method includes a step of assigning to said piece of terminal equipment an identifier of a routing device adapted to route a data packet containing said primary address as the destination address to said piece of terminal equipment and the configuration message further includes said routing device identifier.

In this way, the terminal equipment knows the identity of the device for routing data packets that are intended for it.

According to one aspect of the invention, said configuration message is further sent to a telecommunications network including a routing device able to route to said piece of terminal equipment a data packet containing said primary address as the destination address.

The configuration method of the invention is implemented by a configuration server in a telecommunications network adapted, on reception of a configuration request sent by said equipment, to implement means for:

assigning to said piece of terminal equipment a primary address shared with a plurality of pieces of terminal;

assigning to said piece of terminal equipment a port mask defining a range of numbers dedicated to it and a routing identifier; and sending to said piece of terminal equipment a configuration message including said primary address, said port mask, and said routing identifier.

The invention also provides a method of configuring a piece of terminal equipment connected to a telecommunications network, characterized in that, on reception of a configuration message including configuration data including a primary address, a port mask defining a range of numbers that is dedicated thereto, and a routing identifier, said method includes the following steps:

storing said configuration data; and before sending a data packet into the telecommunications network, selecting a port number in the range of port numbers defined by the port mask, said data packet including as source address the primary address of said piece of terminal equipment and as source port number the selected port number.

According to one aspect of the invention, the configuration method further includes a step of sending the configuration data to a device of the invention for routing a data packet.

This routing device is the attachment device of the piece of terminal equipment. It sees in transit all the data packets intended for the piece of terminal equipment.

According to another aspect of the invention, on reception of a data packet including a destination address, a port number, and a routing identifier, said method further includes a step of verifying that the port number belongs to the range of numbers defined by its port mask and a step of rejecting said packet if the verification result is negative.

The configuration method is advantageously implemented by client terminal equipment connected to a telecommunications network, characterized in that, on reception of a configuration message including configuration data including a primary address having a plurality of pieces of terminal equipment, a port mask defining a range of numbers that is dedicated to it, and a routing identifier, it is adapted to implement means for:

storing said configuration data; and before sending a data packet in the telecommunications network, selecting a port number in the range of port numbers defined by the port mask, said data packet including as source address the primary address of said piece of terminal equipment and as source port number the selected port number.

In one particular implementation of the invention, the steps of the configuration method are determined by computer program instructions.

Consequently, the invention also provides a computer program on a data medium and adapted to be executed in a home gateway or more generally in a computer and including instructions adapted to execute the steps of a configuration method as described above.

The invention further provides a method of translating addresses of a data packet received by a home gateway in a telecommunications network placed between terminal equipment sending said packet and terminal equipment receiving said packet, said packet including a first address and a first port number of the sender terminal equipment, said method being characterized in that it includes a step of replacing said first address and the first port number with a primary address and a second port number, said second port number belonging to a range of numbers dedicated to said gateway and determined by a port number mask.

When terminal equipment finds itself in a home network managed by a home gateway configured in accordance with the invention, the home gateway implements an address translation mechanism that entails not only replacing the first address of the terminal equipment with its primary address but also selecting a port number in its dedicated range.

In one particular implementation, the steps of the method of translating addresses of a data packet are determined by computer program instructions.

Consequently, the invention also provides a computer program on a data medium and adapted to be executed in a home gateway or more generally in a computer and including instructions adapted to execute the steps of a configuration method as described above.

BRIEF DESCRIPTION OF THE DRAWINGS

Other advantages and features of the invention become more clearly apparent on reading the following description of one particular implementation of the invention given by way of illustrative and non-limiting example only, and from the appended drawings, in which:

FIGS. 2A and 2B show two examples of port number masks of the invention;

DETAILED DESCRIPTION

The general principle of the invention relies on assigning the same primary address to a plurality of pieces of terminal equipment in a telecommunications network, these pieces of terminal equipment being uniquely identified by a routing identifier and a port mask defining a range of port numbers that is dedicated to them.

It should be noted that the expression terminal equipment is general and designates equally terminal equipment connected directly to the telecommunications network or to a home gateway.

The inventors have found that pieces of terminal equipment do not make use simultaneously of all the $2^{16}$ (i.e. 65536) port number values available thereto. This range is larger than the real requirements of a client, since a client uses only a few connections for P2P (Peer to Peer), FTP (File Transfer Protocol), web browsing, telephone, etc. applications.

The invention consists in reducing the range of port numbers available to terminal equipment for each application by assigning a piece of terminal equipment a port mask that defines a sub-portion of this range. The port mask assigned in this way to a particular piece of terminal equipment is used in combination with its primary IP address to route data packets that are sent to it without degrading IP service.

It should be noted that an IP connectivity service provider must comply with the constraint that two pieces of terminal equipment having the same primary address must necessarily receive different port masks.

For example, the connectivity service provider may force the value of the most significant bit of the field corresponding to the source port number of the IP data packets sent by a given piece of terminal equipment. The terminal equipment then has available a port mask defining a range of 32768 possible port number values.

In a variant, the provider may force the value of the first eight more significant bits so that the terminal equipment has a usable range of 256 port numbers.

A port number is therefore still coded in a 16-bit field but a portion of the field is forced by the IP connectivity service provider. Two examples of port number masks of the invention are described with reference to FIGS. 2A and 2B, one example of a contiguous mask and one example of a non-contiguous mask:

- a contiguous mask uses an adjacent set of bits (binary representation of the port field). This variant is simple to implement and requires no processing and implementation intelligence for the equipment implementing the invention. The range associated with a contiguous mask is a continuous and unique range. The authorized values are contained within a single interval.
- a non-contiguous mask uses non-adjacent bits. The resulting range of ports may be defined by combining a plurality of "small" continuous ranges. The advantage of this second variant is the possibility of assigning the default range of ports to a plurality of pieces of terminal equipment at the same time.

Figure 1:
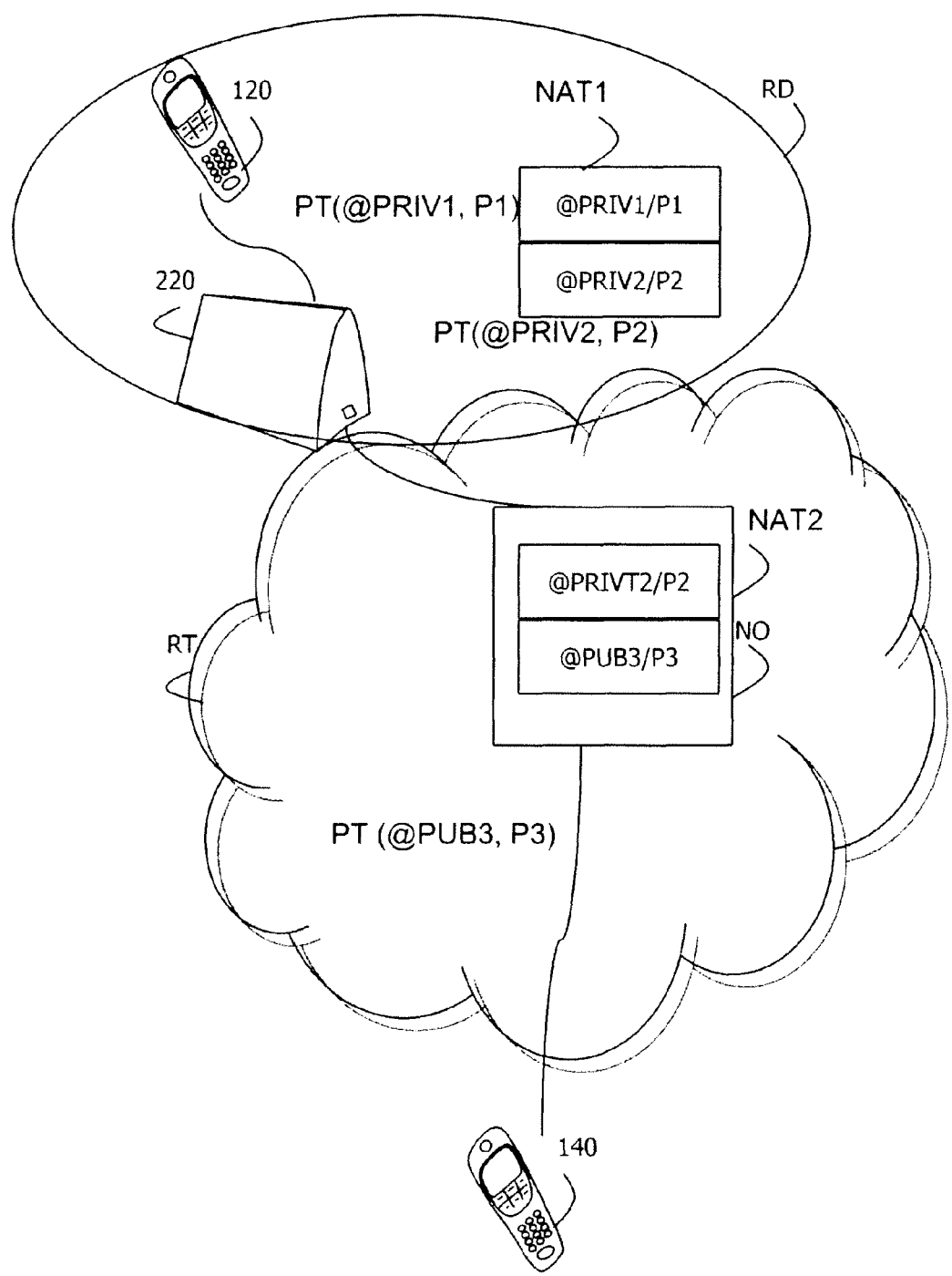
FIG. 1, described above, shows diagrammatically a telecommunications network implementing the prior art Operator NAT function.
Figure 3:
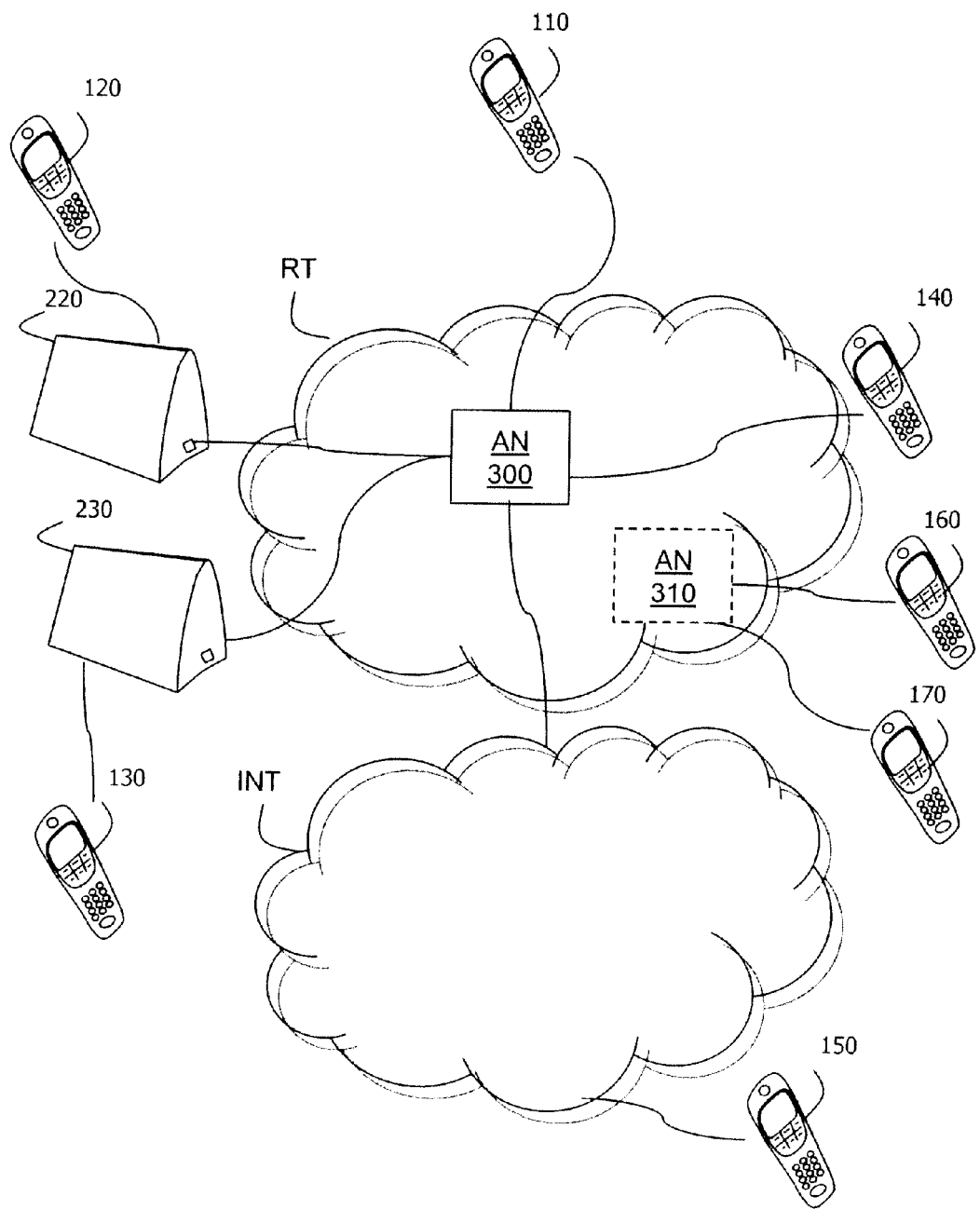
FIG. 3 shows diagrammatically a plurality of pieces of terminal equipment of the invention connected to a telecommunications network of an operator.

A telecommunications network RT of an operator on which a service provider has deployed an IP connectivity or access service architecture is described with reference to FIG. 3. A plurality of pieces of terminal equipment have access to this network. Below the term terminal equipment refers equally to the pieces of terminal equipment 110, 120, 130, 140, 160, 170, for example telephones or personal computers, connected directly to the network RT and to a home gateway 230, 220 between a home network and the telecommunications network RT.

Such a gateway has an address translation table or NAT table that matches a private address and a first port number of a piece of terminal equipment of its private network to at least its own public address and a second port number.

The telecommunications network RT of the operator advantageously includes at least one routing device AN 300 implementing the data packet routing method of the invention. It should be noted that it may include a plurality of other devices, such as the routing device 310.

Figure 4:
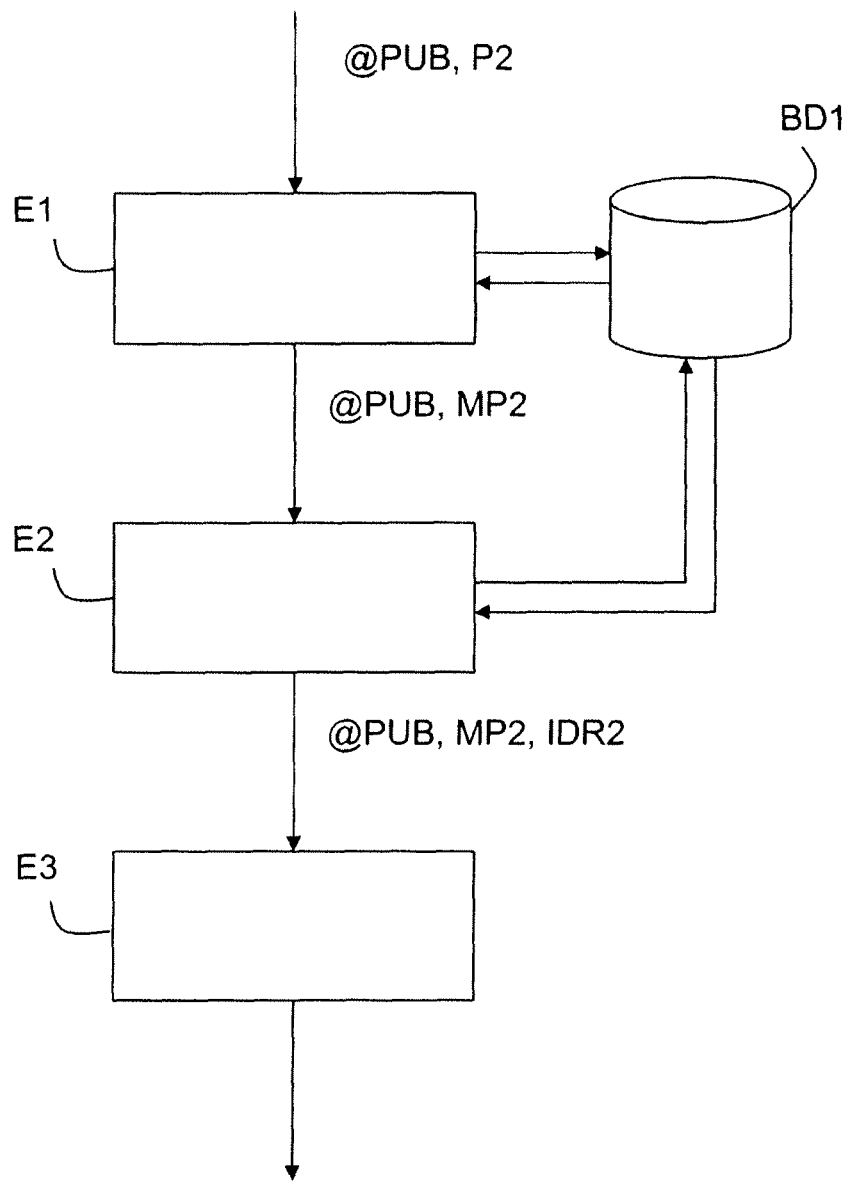
FIG. 4 shows a method of the invention of routing a data packet in a telecommunications network.

This routing method is described below with reference to FIG. 4. On reception of a data packet PT containing a destination public address @PUB and a destination port number P2, the routing method of the invention executes a step E1 of determining a port mask defining a range of port numbers to which the port number P2 belongs. The port masks assigned to the pieces of terminal equipment of the network may advantageously be stored in a database BD1. In a step E2, this port mask MP is used to select a destination equipment of the packet PT from a plurality of pieces of terminal equipment having the same public address @PUB and to identify it by means of its routing identifier IDR. The packet is then routed in step E3 to the destination equipment selected on the basis of its routing identifier IDR. If the routing device AN 300 has no entry in its routing tables, the packet in question is eliminated.

Figure 5:
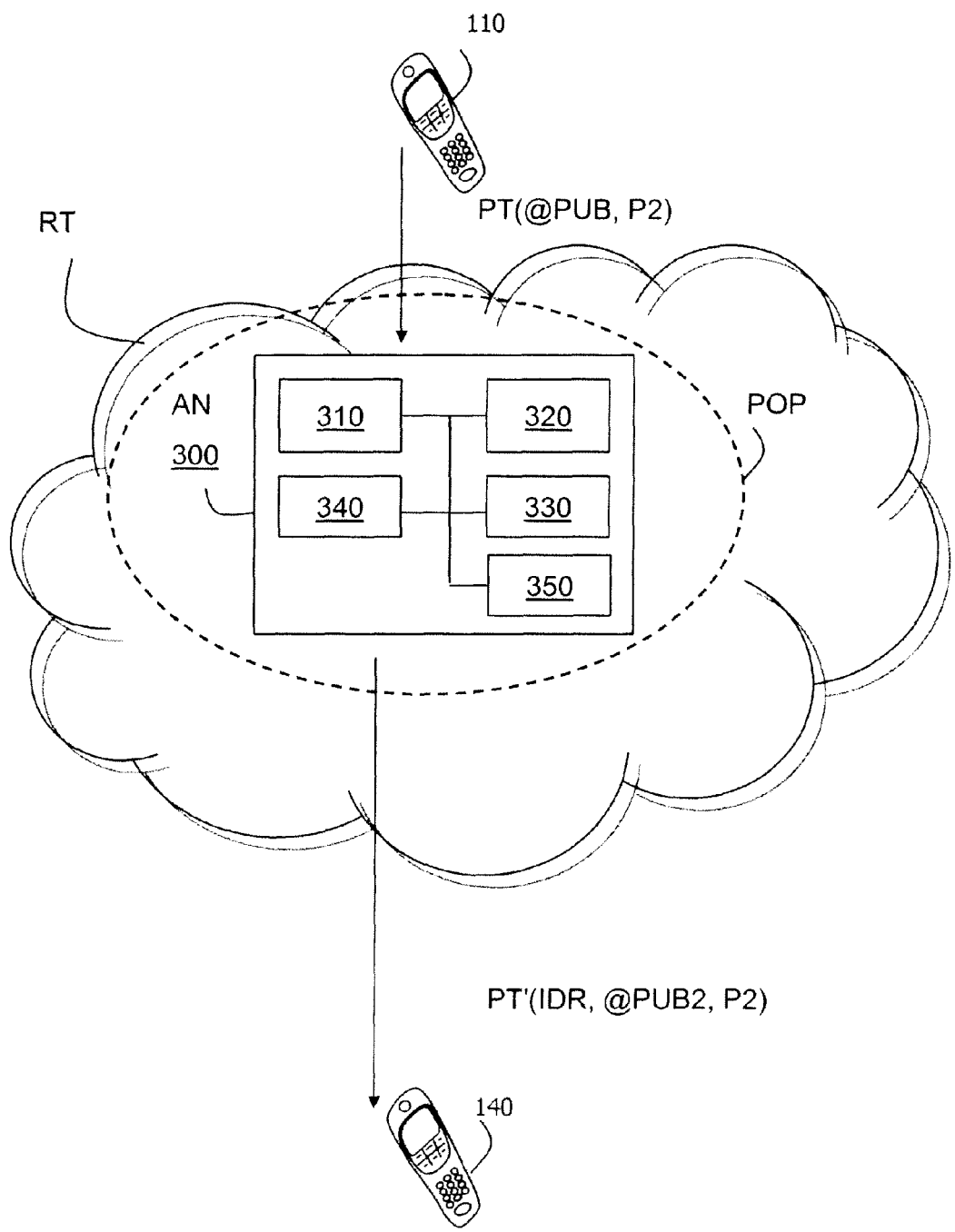
FIG. 5 shows, in its environment, telecommunications network equipment executing the routing method of the invention.

In the implementation described with reference to FIG. 5, the routing device AN 300 of the invention includes the elements that are conventionally found in a conventional computer, namely a processor 310, a random-access memory (RAM) 320, a read-only memory (ROM) 330, and telecommunications means 340 for communicating with the network 1.

According to the invention, the routing device AN 300 includes a memory 350 containing a database in which it stores the association between the public address @PUB, the port mask MP, and the routing identifier IDR of the terminal equipment 100. It should be noted that this memory may equally be external to the device provided that it can access it to recover the identification data of the destination terminal equipment for the received data packet.

The read-only memory 330 constitutes a storage medium of the invention and stores a computer program of the invention including instructions for executing the steps of the routing method of the invention described above with reference to FIG. 4.

The routing device AN of the invention has for its main function maintaining a table of the correspondences between the routing identifier IDR and the pair (public IP address @PUB, port mask MP) so as to be able to determine unambiguously to which piece of terminal equipment the data packet containing the destination address @PUB shared by a plurality of pieces of terminal equipment must be transmitted. The device AN may be located in an access PoP (point of presence) to the telecommunications network RT or it may be centralized. It may be hosted by a router or a by dedicated equipment.

The primary address @PUB of a piece of terminal equipment is announced by the routing device AN, for example using the interior gateway protocol (IGP) such as the routing information protocol (RIP), intermediate system to intermediate system (IS-IS) protocol or OSPF (open shortest path first) protocol. This makes it possible to force the passage of IP packets intended for any public IP address assigned as the main address to at least two pieces of terminal equipment.

In a first implementation of the invention, the routing identifier IDR is a private address, also known as a secondary address, of the terminal equipment. Such an address is not announced by the routing device AN. Consequently, it cannot be routed in the core of the RT network. Nor can it be contacted from the Internet. If the device AN is in an access POP to the network RT, its range is limited to exchanges between the terminal equipment and the equipment constituting said POP.

Figure 6:
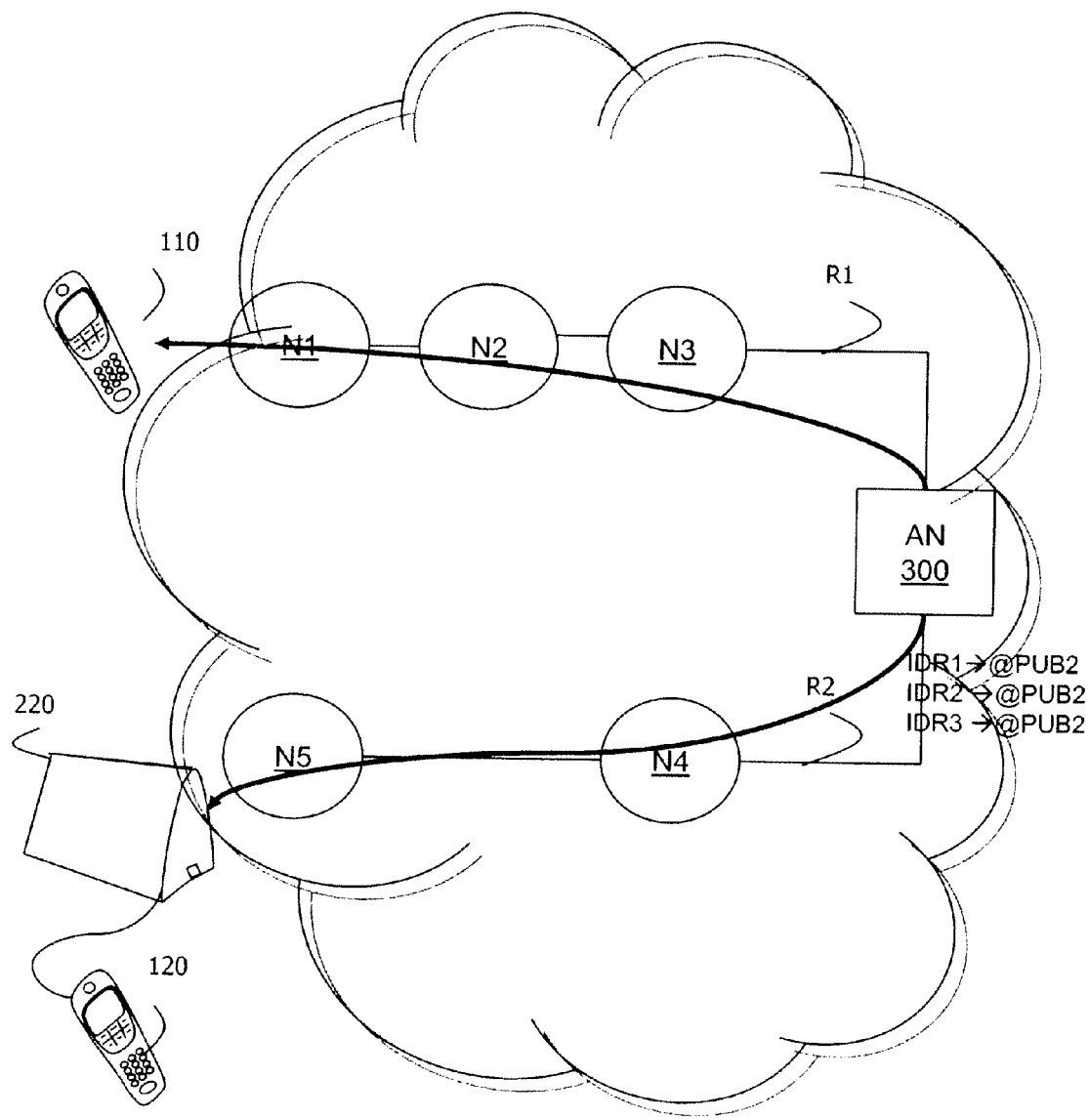
FIG. 6 shows diagrammatically an implementation of the invention in which the routing identifier is a route identifier dedicated to the destination terminal equipment of the data packet.

A second implementation of the routing method of the invention is described below with reference to FIG. 6. In this implementation, the routing identifier IDR is a route identifier dedicated to the terminal equipment. Such an identifier uniquely designates a route that serves the terminal equipment uniquely and unambiguously. This is achievable with the aid of separate routes, for example. Two routes R1 and R2 are referred to as separate if none of the nodes constituting the route R1 in the network of the operator is crossed by the route R2. Accordingly, the routes R1 and R2 consist of a succession of nodes, none of these nodes being shared between the two routes. To this end, the topology of the underlying telecommunications network must be constructed to enable the installation of separate routes in the routing table maintained by the routing device AN of the invention.

Clearly, in the invention, the piece of terminal equipment 100 and the routing device AN 300 must be configured before being connected to the network.

Figure 7:
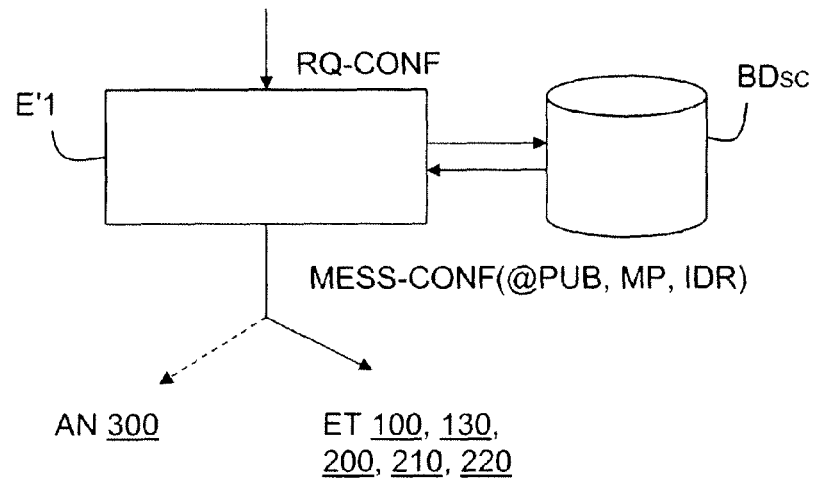
FIG. 7 shows diagrammatically the method of the invention of configuring a piece of terminal equipment.

The method of the invention of configuring a piece of terminal equipment is described below with reference to FIG. 7. On being connected to the telecommunications network RT of the operator, for example following powering up, the terminal equipment 100, 200, 210, 220, 130 sends a configuration request to the IP connectivity service of the service provider in a known manner. Such a request RQ-CONF is received by a configuration server SC that supplies in return the configuration data necessary for implementing its IP connectivity service.

It may be, for example, a DHCP request DHCP_DISCOVER( ) broadcast in the telecommunications network of the IP service provider. This message may be relayed by a DHCP client relay or received directly by a DHCP configuration server. On reception of this message, a DHCP configuration server responds to the sender of the DHCP_DISCOVER( ) message with a dedicated DHCP_OFFER( ) message containing a DHCP lease.

The configuration method of the invention is used by the configuration server SC on reception of the configuration request RQ-CONF. A step E"1 assigns to said piece of terminal equipment a public address that is shared with a plurality of pieces of terminal equipment. A step E"2 then assigns to said piece of terminal equipment a port mask MP defining a range of numbers that is dedicated to it and a routing identifier IDR. Such configuration data @PUB, IDR, and MP is finally sent to said piece of terminal equipment in a configuration message MESS-CONF.

According to one aspect of the invention, the configuration server designates an attachment routing device AN 300 for the piece of terminal equipment. The configuration data is also sent to this routing device AN 300 by the configuration server SC. The configuration message MESS-CONF then further includes an identifier of the attachment routing device AN 300.

If configuration is effected by a DHCP server, the configuration message MESS-CONF is a DHCP_OFFER( ) type offer that contains the IP configuration data relating to the configuration of the terminal equipment that requested it. Such data includes at least:

an IPv4 secondary address @PRIV;
an IPv4 primary address @PUB;
a port mask MP that is the subject of a new DHCP option with the following format:

| Code | Len | Val |
|---|---|---|
| TBA | variable | MP |

Code: this field gives the code of the option. The value of this field must be assigned by the Internet Assigned Numbers Authority (IANA); the length of this field is 1 byte;

Len: this field gives the length of the value of the option; for the port mask option, the value of this field is equal to "variable";

Val: this field gives the value of the port mask; this value is coded as the "port" field of the IP transport protocols; the value MP is used to determine the range of port numbers usable by a home gateway.

The identifier of the attachment routing device AN may in this situation be an identifier a.b.c.d. equal to its IP address or to its fully-qualified domain name (FQDN). It is also the subject of a new DHCP option.

The form of the attachment routing device option (DAN) is as follows:

| Code | Len | Val |
|---|---|---|
| TBA | variable | MP |

Code: this field gives the code of the option. The value of this field must be assigned by the Internet Assigned Numbers Authority (IANA); the length of this field is 1 byte;

Len: this field gives the length of the value of the option; for the attachment routing device option (DAN), the value of this field is equal to "4";

Val: this field gives the value of the parameter DAN; this value is coded in the form of an IP address.

The DHCP configuration service must be modified to implement the invention and notably to assign the new configuration data to any terminal equipment, for example a home gateway, requesting IP connectivity access.

In the implementation of the invention described with reference to FIG. 8, the configuration server SC 400 of the invention includes the hardware elements conventionally found in a conventional computer, namely a processor 410, a random-access memory (RAM) 420, a read-only memory (ROM) 430, and telecommunications means 440 for communicating with the network 1.

According to the invention, the configuration server SC 400 includes a memory 450 containing a database in which it stores the configuration data of the pieces of terminal equipment that it manages, notably the association between the primary address @PUB, the port mask MP, and the routing identifier IDR of the piece of terminal equipment 100. It should be noted that this memory may equally be external to the configuration server provided that it can access it to recover the configuration data of the terminal equipment sending the configuration request.

Figure 9:
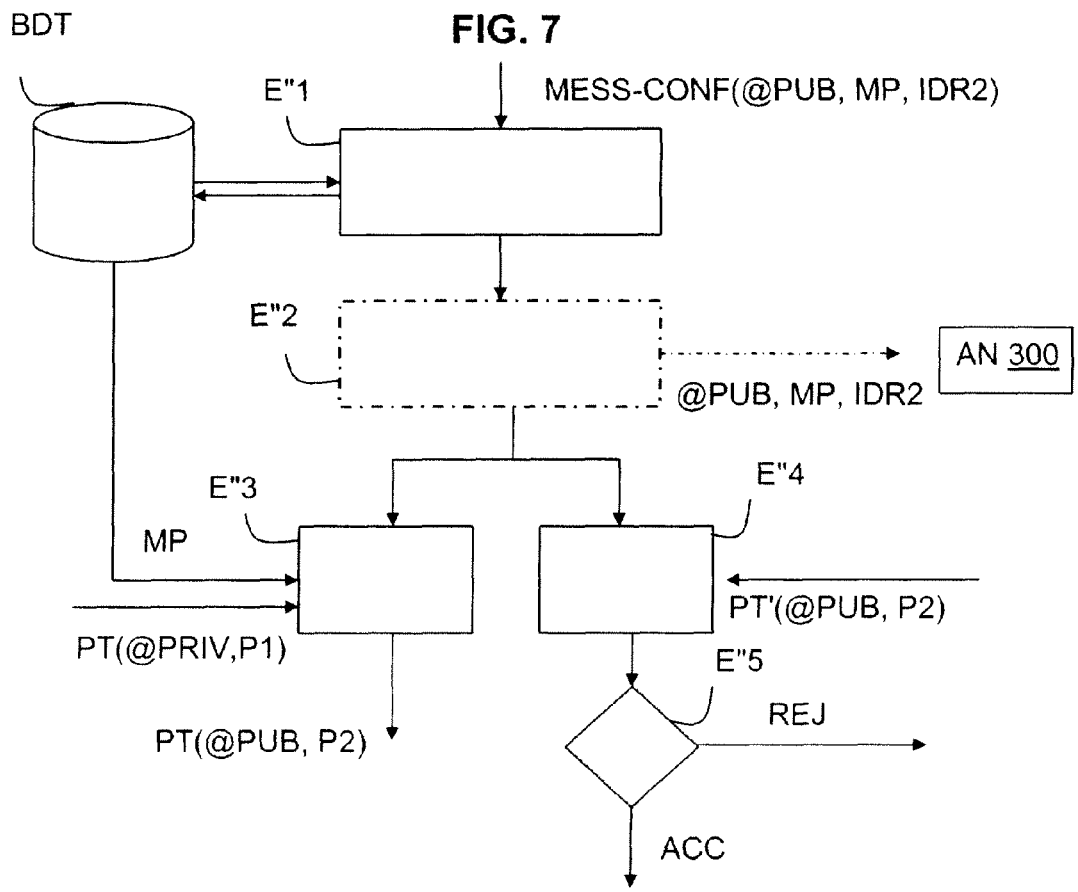
FIG. 9 shows a terminal equipment configuration method of the invention.

In response to a configuration request sent to the configuration server SC 400, the terminal equipment of the invention receives the configuration message MESS-CONF containing the configuration data of its IP connectivity to the telecommunications network RT. On reception of this message, it executes the configuration method of the invention described below with reference to FIG. 9. In a step E"1 it stores the received configuration data in the database BDT. When it wishes to send a data packet PT into the telecommunications network RT, it selects (step E"3) a port P2 in the range of port numbers defined by the port mask PT and it assigns to the data packet PT a source port corresponding to the port P2.

On reception of a data packet PT' from the telecommunications network, it executes a step E"4 of verifying that a port P'2 of said packet belongs to the port mask MP and rejects the packet (step E"5) if the result of the verification is negative.

In a variant, the method further includes a step E"2 of sending configuration data to the equipment AN 300 of the telecommunications network RT including the routing device of the invention.

It is therefore clear that the routing device of the invention may be configured either via the terminal equipment or directly by the configuration server SC 400.

Configuration via the terminal equipment applies when the routing identifier IDR is a secondary address @PRIV. After activating the new configuration received in the configuration message MESS-CONF, which may be a DHCP lease, the terminal equipment generates a configuration message BIND( ) to the routing device AN of the invention. This device is identified by the address DAN in the message MESS-CONF. The message BIND(@PRIV, @PUB, MP) includes at least the main address of the terminal equipment, its routing identifier IDR, and its port mask. It advantageously further includes an identifier of the routing device able to route to the terminal equipment data packets that are addressed to it. It is sent by the terminal equipment with a source address equal to @PRIV. On reception of this message, the routing device AN sends an acknowledgement to the terminal equipment sending it by means of an acknowledgement message.

If the routing identifier IDR is a route identifier dedicated to the terminal equipment, two variants may be envisaged for sending the message BIND( ). In both variants, the configuration server SC knows all of the routes maintained by the routing device AN:
  in the first variant, the message BIND( ) is advantageously sent to the routing device AN by the configuration server SC. It should be noted that, in the latter event the configuration server sends the message BIND( ) and this message includes the main address @PUB, the port mask MP, and the identifier of the route to be used. On reception of this message, by consulting its routing table with pre-installed separate routes, the routing device of the invention associates a specific route identifier with the equipment IDR and (@PUB, MP) received.
  in the second variant, the identifier of the route to be used is sent by the configuration server SC on the same terms as @PUB and MP. The terminal sends a message BIND( ) containing the following information: @PUB, MP, and IDR. However, this second variant is not recommended because clients should not be aware of the routing policies installed by the service provider.

Figure 8:
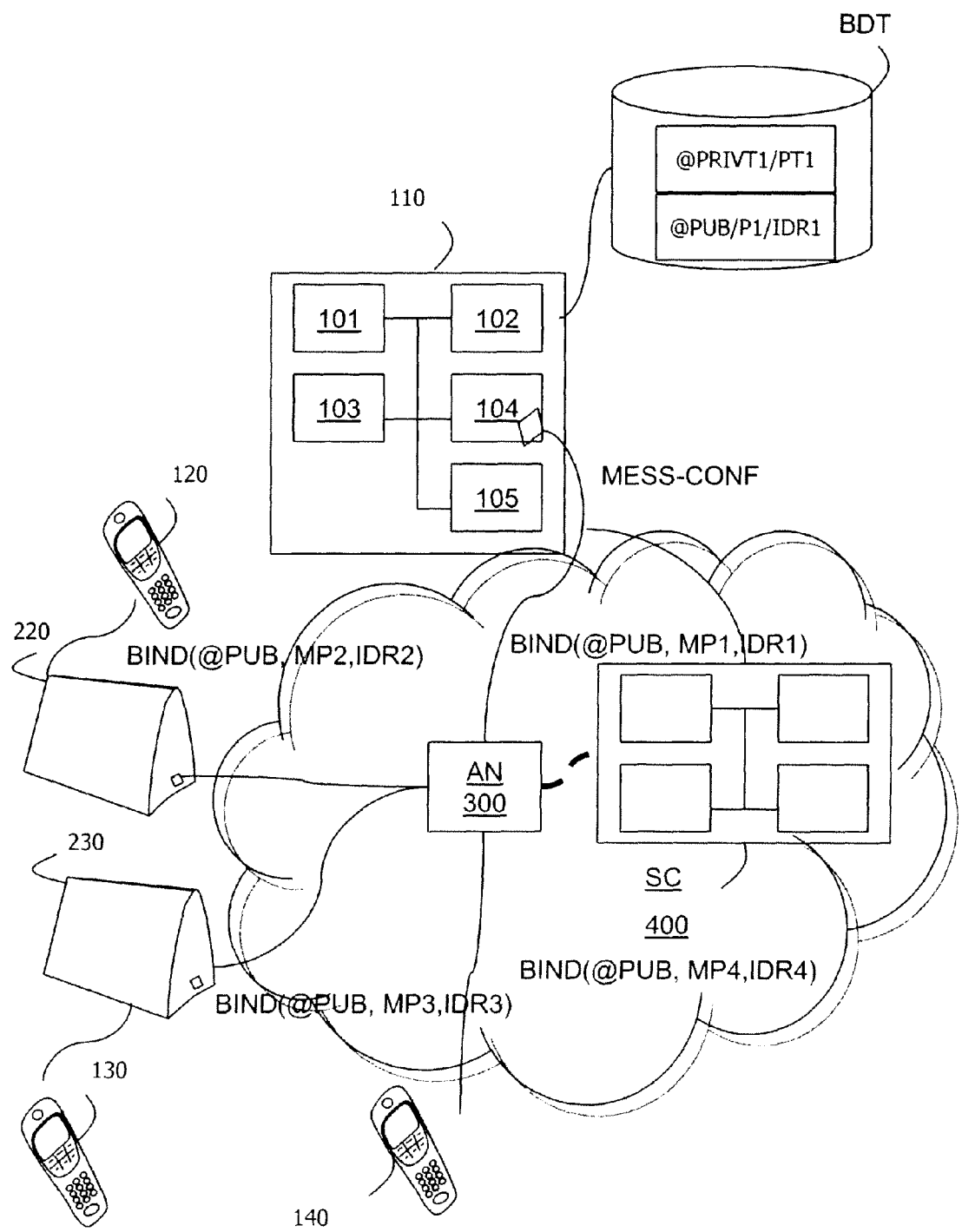
FIG. 8 shows diagrammatically, in its environment, terminal equipment executing the configuration method of the invention.

The content of the BIND( ) messages sent to the routing device AN 300 by the following pieces of terminal equipment is considered with reference to FIG. 8:
  the terminal equipment 110 sends the message BIND(@PUB1, MP1, IDR1);
  the home gateway 220 of the terminal equipment 120 sends the message BIND(@PUB2, MP2, IDR2);
  the home gateway 230 of the terminal equipment 130 sends the message BIND(@PUB3, MP3, IDR3);
  the terminal equipment 140 sends the message BIND(@PUB4, MP4, IDR4).

Once the message BIND( ) has been received by the routing device AN of the invention, the device AN proceeds to instantiate a new entry in a table of associations (or bindings). Said table makes it possible to determine unambiguously to which of all the machines generated by the routing device AN having the same main address @PUB it is necessary to send a message addressed to said given IP address (i.e. @PUB) assigned as the main address.

To this end, the routing device AN maintains the association (IDR, (@PUB, MP)). In the FIG. 8 example, the table of associations contains the following associations:
  IDR1 (@PUB, MP1)
  IDR2 (@PUB, MP2)
  IDR3 (@PUB, MP3)
  IDR4 (@PUB, MP1)

In a variant implementation, the signature of the message BIND( ) may contain a lifetime as given in the DHCP lease. Moreover, an association installed in the association table may be refreshed by means of other messages BIND( ). If no update is received before the lifetime expires, the corresponding entry is eliminated from the list (a margin of accuracy may be envisaged).

In another variant, the message BIND( ) may be sent by the configuration server SC 400 and not by the terminal equipment that has just been configured. The information required for installing a new entry in the table of associations may be sent directly by the service provider to the routing device AN 300 via the configuration server SC 400.

The example of a data packet PT (@PUB, P2) sent by the terminal equipment 110 to the terminal equipment 120 is considered with reference to FIG. 8. On reception of this packet addressed to an IP main address @PUB, the routing device AN proceeds to read the destination port number P2 of said message and deduces the corresponding port mask MP2. Using this mask and the main address @PUB, the routing device AN determines, by scanning its table of associations, the routing identifier IDR2, for example the secondary address @PRIV2 associated with the pair (@PUB, MP2).

Following determination of the secondary address, the routing device AN transforms the received IP packet into a packet PT'(@PUB, P2, IDR2). For security reasons, the destination port number to be used for this packet PT' is negotiated between the terminal equipment 120 and the routing device AN.

It should be noted that the packet PT may be transformed in various ways. In a first implementation of the invention it is encapsulated in a packet PT' containing by way of destination address the secondary address @PRIV2 of the destination terminal equipment 120, for example.

In a second implementation of the invention, the packet PT is modified to include the secondary address @PRIV2 in a particular field of its header. This transformation of the data packet makes a source routing mode possible. It is not always supported by the nodes of a telecommunications network.

In a third implementation of the invention, the packet PT is transformed identically, routing being effected on the basis of the dedicated route identifier IDR2, which requires no modification of the packet.

In the implementation of the invention described with reference to FIG. 8, the terminal equipment 100 of the invention includes the hardware elements conventionally found in a conventional computer, namely a processor 110, a random-access memory (RAM) 120, a read-only memory (ROM) 130, and telecommunications means 140 for communicating with the network 1.

According to the invention, the terminal equipment 100 includes a memory 150 containing a database in which it stores its configuration data, notably the association between the public address @ PUB, the port mask MP and the routing identifier IDR of the terminal equipment 100. It should be noted that this memory may equally be external to the terminal equipment provided that it can access it to recover the configuration data that it needs to make use of its IP connectivity to the telecommunications network RT.

Figure 10:
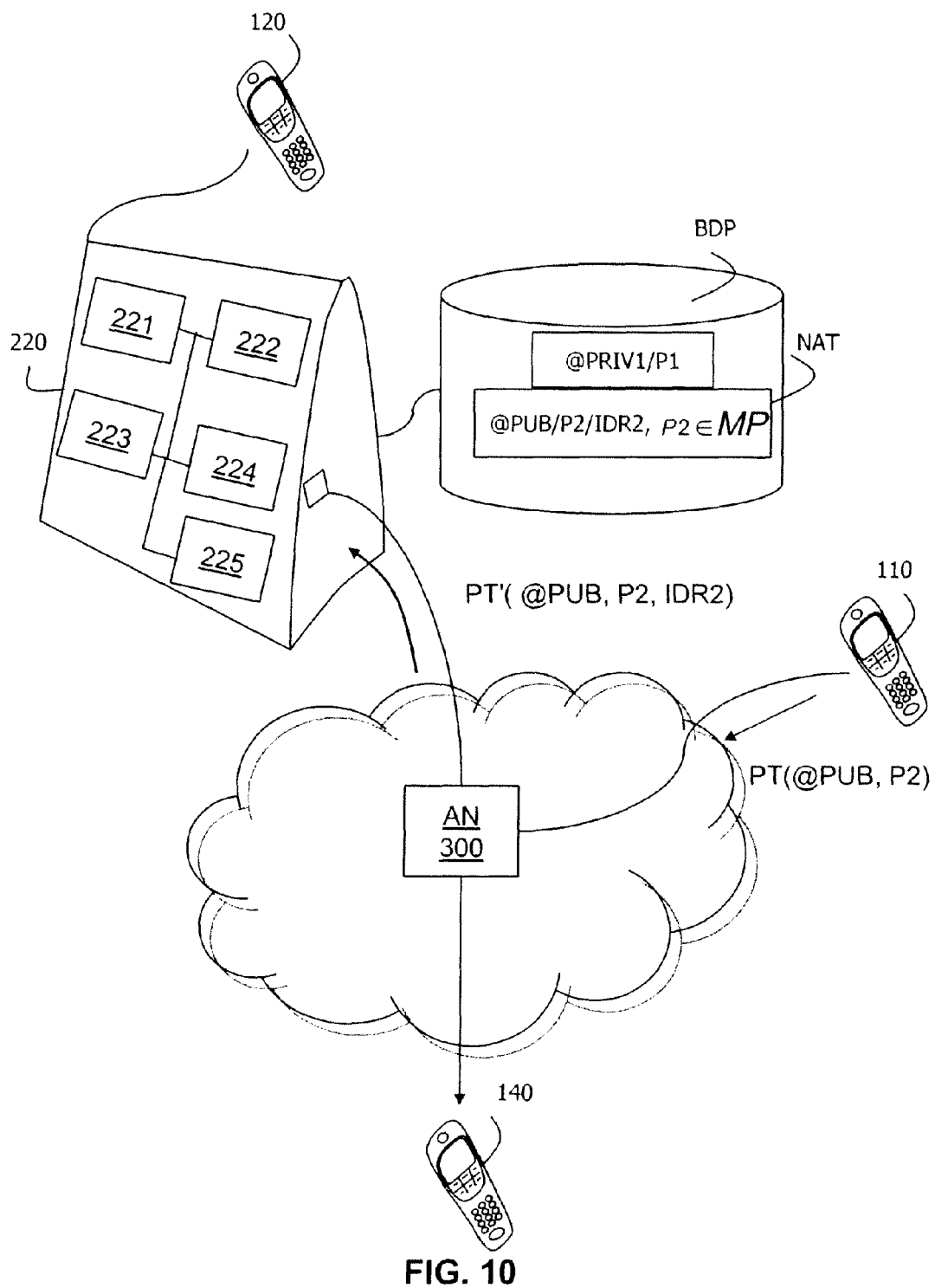
FIG. 10 shows diagrammatically, in its environment, a home gateway implementing the configuration method of the invention.

In an implementation of the invention described with reference to FIG. 10, there is considered a piece of terminal equipment 110 connected to the home network of a home gateway 210 between the terminal equipment 110 and the telecommunications network RT. In this implementation, the home gateway 210 constitutes terminal equipment of the invention. In known manner, it includes an address translation table or NAT table that, for a stream sent by a terminal equipment 110 of its home network, matches an address @ PRIV1 and a port P1 of the terminal in the home network with at least one public address @ PUB2 and a port P2 of the home gateway 210 in the telecommunications network RT of the operator, P2 belonging to the range of numbers defined by the port mask MP. This table NAT is stored in a database BDP, for example, which may be internal or external.

A home gateway of the invention therefore uses address translation means on reception of a data packet PT sent by a terminal equipment of its home network and addressed to the telecommunications network and on reception of a data packet PT' addressed to that terminal equipment.

For outgoing calls, the only difference compared to existing practices is that the terminal equipment 110 or the home gateway 120 of the invention is obliged to choose a source port in the range fixed by the port mask assigned by the service provider. All messages, with the exception of BIND( ) messages, are sent with as their source address the main address or the public address @ PUB assigned by the service provider. For BIND( ) messages, the source address used is the secondary address IDR2=@ PRIV2.

The data packets sent by a given piece of terminal equipment advantageously pass in transit through the routing device AN 300 to which this terminal equipment is attached. The routing device AN proceeds to mark the IP data packets sent by this terminal equipment. The DS (differentiated services) or ToS (type of service) field of the IP packets may be used for marking if and only if the mask of the port does not exceed 6 bits. On reception of the message BIND( ) the routing device AN pre-installs a marking rule for messages sent by the terminal equipment in question. The encapsulation process is then guided by the value of the field DS of the IP packets received and thus the routing device AN no longer needs to inspect the information relating to the transport layer. This improves the message processing time. This variant assumes that the terminal machine does not modify the DS/ToS code used and that it is reset to the same value for the response packets.

The routing device of the invention may be hosted by traditional routers or by dedicated pieces of equipment. Given that the modifications required by the invention during the phase of discovering a configuration server, for example under the DHCP protocol, are not major, current architectures may be adapted.

The routing device AN of the invention may be hosted anywhere in the telecommunications network of the operator. It is advantageously deployed in a network access POP. Moreover, one or more routing devices AN may be deployed within the same IP access POP, in either centralized or distributed manner.

The invention claimed is:

1. A method of routing an IP data packet in a telecommunications network to a destination equipment, said packet comprising a primary destination address and a destination port number, said method comprising, on reception of said packet, the following steps:
   determining a port mask assigned to the destination equipment, the port mask defining a range of port numbers to which the destination port number belongs;
   selecting at least one identifier of the destination equipment of the packet from a plurality of equipment identifiers associated with said primary destination address based on the port mask; and
   routing the packet to the destination equipment based on said identifier.

2. The method according to claim 1 of routing an IP data packet, wherein said at least one identifier is a secondary destination address of the destination equipment.

3. The method according to claim 2 of routing an IP data packet, comprising, before the routing step, a step of transforming the packet by adding said secondary address to the packet, and routing the packet based on said secondary destination address.

4. The routing method according to claim 1, wherein the at least one identifier is a route identifier specific to said destination equipment and the packet is routed based on said specific route identifier.

5. A device for routing an IP data packet in a telecommunications network to a destination equipment, said packet comprising a primary destination address and a destination port number, wherein said device comprises, on reception of said packet:
   a processor that determines a port mask assigned to the destination equipment, the port mask defining a range of port numbers to which the destination port number belongs;
   the processor selects an identifier of the destination equipment of the packet from a plurality of equipment identifiers associated with said primary destination address based on the port mask; and
   a communication unit that routes the packet to the destination equipment based on said identifier.

6. Telecommunications network equipment adapted to receive an IP data packet comprising a primary destination address and a destination port number, comprising at least one routing device comprising:
   a processor that determines a port mask assigned to a destination equipment, the port mask defining a range of port numbers to which the destination port number belongs;
   the processor selects an identifier of the destination equipment of the packet from a plurality of equipment identifiers associated with said primary destination address based on the port mask; and a communication unit that routes the packet to the destination equipment based on said identifier.

7. A method of configuring a piece of terminal equipment connected to a telecommunications network, comprising, on reception of a configuration request sent by said equipment, the following steps:
   assigning to said piece of terminal equipment a primary address shared with a plurality of pieces of terminal equipment;
   assigning to said piece of terminal equipment a port mask defining a range of numbers dedicated to it and a routing identifier; and
   sending to said piece of terminal equipment a configuration message comprising said primary address, said port mask, and said routing identifier.

8. The method according to claim 7 of configuring a piece of terminal equipment, comprising a step of assigning to said piece of terminal equipment an identifier of a routing device adapted to route a data packet comprising said primary address as the destination address to said piece of terminal equipment, and the configuration message further comprising said routing device identifier.

9. The configuration method according to claim 7, wherein said configuration message is further sent to a routing device that routes to said piece of terminal equipment a data packet containing said primary address as the destination address.

10. A configuration server in a telecommunications network, wherein, on reception of a configuration request sent by a piece of terminal equipment, comprising:
   a processor that assigns a primary address to said piece of terminal equipment, said primary address being shared with a plurality of pieces of terminal equipment;
   the processor assigns to said piece of terminal equipment a port mask defining a range of numbers dedicated to it and a routing identifier; and
   a communication unit that sends to said piece of terminal equipment a configuration message comprising said primary address, said port mask, and said routing identifier.

11. A method of configuring a piece of terminal equipment connected to a telecommunications network, wherein, on reception of a configuration message comprising configuration data comprising a primary address, a port mask defining a range of port numbers that is dedicated thereto, and a routing identifier, said method comprises the following steps:
   storing said configuration data; and
   before sending a data packet into the telecommunications network, selecting a port number in the range of port numbers defined by the port mask, said data packet comprising as source address the primary address of said piece of terminal equipment and as source port number the selected port number.

12. The configuration method according to claim 11, wherein, once an identifier of a routing device adapted to route a data packet comprising said primary address as the destination address to said piece of terminal equipment has been received, said method further comprises a step of sending the configuration data to said routing device.

13. The configuration method according to claim 11, wherein, on reception of a data packet comprising a destination address, a port number, and a routing identifier, said method further comprises a step of verifying that the port number belongs to the range of port numbers defined by the port mask, and a step of rejecting said packet if result of the verification is negative.

14. A piece of client terminal equipment connected to a telecommunications network, wherein, on reception of a configuration message comprising configuration data comprising a primary address shared with a plurality of pieces of terminal equipment, a port mask defining a range of port numbers that is dedicated to the piece of client terminal equipment, and a routing identifier, the piece of client terminal equipment comprising:
   a memory that stores said configuration data;
   before sending a data packet in the telecommunications network, a processor that selects a port number in the range of port numbers defined by the port mask, said data packet comprising as source address the primary address of said piece of client terminal equipment and as source port number the selected port number.

15. A non-transitory computer readable medium encoded with program code instructions executable by a microprocessor to perform the method according to claim 1.

16. A non-transitory computer readable medium encoded with program code instructions executable by a microprocessor to perform the method according to claim 7

17. A non-transitory computer-readable medium encoded with program code instructions executable by a microprocessor to perform the method according to claim 11.

* * * * *